United States Patent Office 2,986,234
Patented May 30, 1961

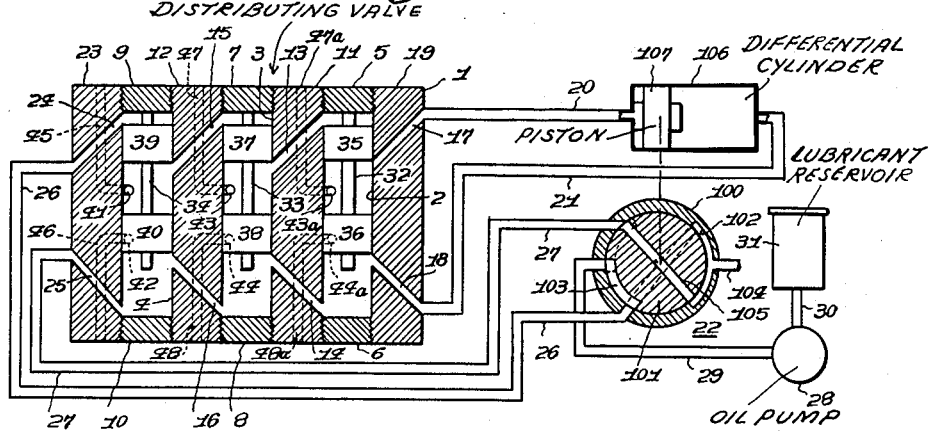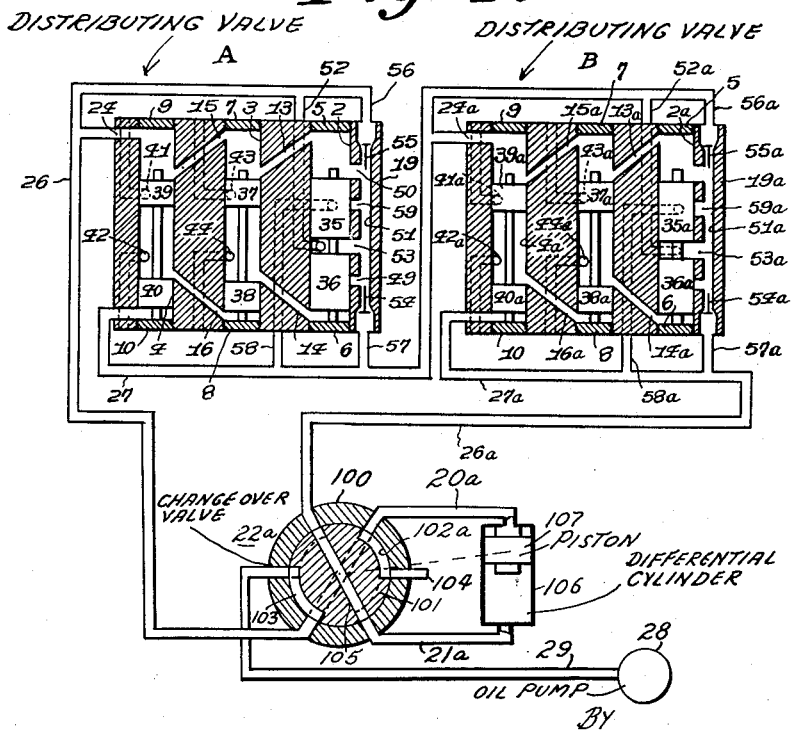

2,986,234
LUBRICANT DISTRIBUTING VALVE DEVICE

Hayao Akamatsu, Kamakura-shi, and Tohei Honami and Tadashi Yoshikawa, Tsurumi-ku, Yokohama-shi, Japan, assignors to Shibaura Kyodo Kogyo Kabushiki Kaisha, Yokohama-shi, Japan, a joint-stock company of Japan Filed Oct. 28, 1958, Ser. No. 770,035
Claims priority, application Japan Nov. 9, 1957
3 Claims. (Cl. 184—7)

This invention relates to an improved lubricant dispensing system for distributing a lubricant under pressure and which is simple and rugged in construction.

The conventional intermittently operating oiling device which is now widely used in machine tools, rolling mills and the like comprises two main pipes, a plurality of distributing valves connected in parallel across the main pipes, an oil pump and a change over valve connected between said pump and said two main pipes so as to change the connection of the main pipes to make alternately one of them act as the outlet pipe and the other as the return pipe. Each distributing valve comprises a pilot piston and a main piston of different diameter. The pilot piston acts to control the supply and discharge of oil to and from the cylinder containing the main piston therein. When all the main pistons have completed their operation, the pressure in the outlet pipe will rise to a predetermined value to actuate a suitable pressure responsive device to stop the oil pump and actuate the change over valve.

Although the operation of such oiling device as described above is satisfactory, it requires one pilot piston for each main piston, so that the weight and cost of the oiling device becomes too large when many distributing valves are required. Moreover, since all the distributing valves are connected in parallel across two main pipes, the capacity of the oil pump must be increased in proportion to the number of the distributing valves used.

It is, therefore, an object of this invention to provide a distributing valve for use in an intermittent oiling system which is simple in construction, cheap and light weight.

Another object of this invention is to provide a distributing valve which can supply a lubricant of a predetermined quantity to any desired number of moving parts which require oiling by using two or more pistons of the same configuration.

Still another object of this invention is to provide a distributing valve which can sequentially supply a lubricant of a predetermined quantity to a number of moving parts with a lubricant pump of a relatively small capacity.

Another object of this invention is to provide a distributing valve which can sequentially supply a lubricant of a predetermined quantity at substantially the same pressure to a plurality of moving parts.

Generally speaking, the distributing valve of this invention comprises a plurality of cylinders of the same size, a plurality of pistons, one in each cylinder, passages placing adjacent cylinders in communication, lubricant outlet ports in each cylinder and means for supplying pressure lubricant to one cylinder for actuating the pistons in a predetermined sequence. The pistons, passages and lubricant outlet ports are arranged in such a manner that the lubricant in one cylinder is forced through the lubricant outlet port of the preceding cylinder. Thus, each piston acts as a main piston for sending out a predetermined quantity of the lubricant and also as a pilot piston for controlling the flow of the lubricant, whereby the construction of the distributing valve is materially simplified. The piston is preferably of the double acting tandem type so that it may control two lubricant outlet ports by its reciprocating motion. A suitable change over valve is associated with the distributing valve to actuate the cylinders in one direction and then in the opposite direction.

In accordance with another feature of this invention, there is added a shunt path controlled by the last operating piston. By this arrangement, any desired number of distributing valves may be connected in cascade to operate sequentially but with substantially the same pressure, thus assuring equal supply of the lubricant to quite a large number of moving parts which need adequate oiling.

The invention will be better understood when studied in conjunction with the following description and the accompanying drawing, in which the same members are indicated by the same reference characters and in which:

Fig. 1 is a schematic view of an oiling device utilizing a distributing valve embodying this invention, the distributing valve being shown in section; and Fig. 2 is a schematic view of another oiling device using another embodiment of the distributing valve of this invention, the distributing valve being shown in section.

Referring now to Fig. 1, a plurality of parallel cylinders 2, 3 and 4 are provided in the casing 1 of the distributing valve. The upper and lower ends of each cylinder are, respectively, closed by screw threaded plugs 5 to 10 inclusive. Partitions 11 and 12 between adjacent cylinders are provided with oblique passages 13, 14 and 15, 16. One end of each oblique passage is open in one cylinder at the position near its end, while another end thereof is open in adjacent cylinder at the position near its central portion. Passages 17 and 18 which are provided through one end wall 19 of the casing 1, in spaced relation in the vertical direction, are connected, respectively, through pipes 20 and 21, to a differential cylinder 106 for actuating a change over valve 22, as will be explained later. Similarly, in an opposite end wall 23, there are provided a pair of passages 24 and 25 which are spaced in an axial direction of the cylinder and connected, respectively, to the change over valve 22 through pipes 26 and 27. It is advantageous to incline the passages 17, 18, 24 and 25 in the same manner as passages 13 to 16. As will be more fully explained later, the pipes or conduits 20, 21, 26 and 27 are caused to operate alternately as an inlet pipe or an outlet pipe by the action of the change over valve 22. An oil pump 28 is provided which is connected with the change over valve 22 through a delivery pipe 29 and connected with an oil or lubricant reservoir 31 through a pipe 30. In each cylinder 2, 3 and 4, there is provided respective tandem pilot piston pairs 35 and 36, 37 and 38, and 39 and 40, each pair being connected by piston rods 32, 33 and 34, respectively. These pilot pistons are caused to slide in the corresponding cylinders by the action of the oil pressure as will be explained later. Oil outlet ports 41 and 42 are provided in spaced relation on the wall of the cylinder 4 and similar oil outlet ports 43 and 44 and 43a and 44a are provided on the wall of the cylinders 3 and 2, which are, respectively, opened or closed by the movement of the piston pairs 39 and 40, 37 and 38, and 35 and 36. As shown by dotted lines, these ports are connected to various parts requiring adequate oil supply through passages 45, 46, 47, 48, 47a and 48a.

The change over valve 22, schematically shown in the drawing, comprises a cylindrical valve casing 100 and a rotary valve 101 which is rotatably disposed therein.

On the inner periphery of the valve casing 100, there is provided a groove 102 leading to a drain tank (not shown) through a pipe 104, and the pipe 29 is connected to the casing 100 at a point between the pipes 26 and 27. The rotary valve 101 is provided with a diametrical passage 105 and with an arcuate groove 103 at its outer periphery of the length to span over pipes 26 and 29 or 29 and 27. The differential cylinder 106 includes therein a piston 107 which is operatively connected to the rotary valve 101 as shown schematically by the dotted line.

The operation of the distributing valve device is as follows: Assuming now that the rotary valve of the change over valve 22 is in the position shown by dotted lines in Fig. 1, and that the pump 28 is started by energizing its driving motor (not shown) by manual or automatic control device, such as a clock timer. Then, lubricant such as oil or grease (for brevity, hereafter called an oil) is supplied under pressure into the space of the cylinder 4 beneath the piston 40 by way of pipe 29, groove 103 and pipe 27. This will cause the pistons 39 and 40 to move upwardly, whereby the lower oblique passage 16 in the partition 12 is opened to introduce pressure oil into the lower portion of the cylinder 3 from the cylinder 4. Thus, the pistons 37 and 38 are forced to the upper position shown in the drawing. By this upward movement, a predetermined quantity of oil between the plug 7 and the piston 37 is forced into the space between the pistons 39 and 40 through the passage 15. Since the oil outlet port 41 is open at this time, the oil introduced in the space between the pistons 39 and 40 will be supplied to parts requiring oiling. The other port 42 is closed by the piston 40 at this time. The upward movement of the pistons 37 and 38 will result in the introduction of the oil into the lower portion of the adjacent cylinder 2 through the lower oblique passage 14 to force the pistons 35 and 36 in the upward direction. Then, the oil between the plug 5 and the piston 35 will be introduced into the space in the cylinder 3 between the pistons 37 and 38 through the upper oblique passage 13 and thence to parts requiring oiling through the passage 47 and oil outlet port 43 which is now open. When the pistons 35 and 36 have finished their upward stroke, the passage 18 is opened and the oil in the lower portion of the cylinder 2 will enter into the right hand portion of the differential cylinder 106 to force its piston 107 to left. The oil in the cylinder is sent out through the pipe 20, passage 17, the space between the pistons 35, 36, outlet port 43a and passage 47a. The volume of the cylinder 106 is made to be equal to that of the space between the pistons 35 and 36.

When the piston 107 moves to the left, it rotates the rotary valve 101 in a counterclockwise direction to bring it to the position shown by solid lines of the drawing. In this position, the pipe 29 is connected to the pipe 26 through the groove 103, and the pipe 27 to the drain pipe 104 through the passage 105. Although not shown in the drawing, a suitable limit switch is associated with the change over valve so as to deenergize the pump driving motor whenever the piston 107 is moved to its left or right hand position.

Next time when the oil pump 28 is started manually or by such a suitable automatic device as a clock timer, the oil is now delivered to the pipe 26. The oil sent into the upper portion of the cylinder 4 will force the pistons 39 and 40 in a downward direction. By this movement, the oil supply port 41 will be closed by the piston 39, while the port 42 will be opened by the piston 40. After the piston 40 has closed the passage 16, the oil in the lower portion of the cylinder 4 is exhausted to the drain through the pipe 27 and change over valve 22. When the pistons 39 and 40 reach their lowermost position, the oblique passage 15 will establish communication between the upper portions of cylinders 3 and 4, whereby the oil is introduced into the upper portion of the cylinder 3. This will cause downward movement of the pistons 37 and 38 to force the oil in the cylinder 3 beneath the piston 38 to enter into the space between the pistons 39 and 40 through the passage 16 and then parts requiring oiling through the port 42 and the passage 46. The downward movement of pistons 37 and 38 will close the oil outlet port 43 and open the oil outlet port 44. The oblique passage 13 will establish communication between the upper portions of the cylinders 3 and 2 to introduce the pressure oil into the upper portion of the piston 35, thus forcing the pistons 35 and 36 in the downward direction in the cylinder 2. Then the oil in the cylinder 2 beneath the piston 36 will be sent to the space in the cylinder 3 between the pistons 37 and 38 and thence to parts requiring oiling through the ports 44 and the passage 48. When the pistons 35 and 36 reach the lowermost position in the cylinder 2, the oil is sent into the differential cylinder 106 to move the piston 107 to its righthand position, thus rotating the rotary valve 101 in the clockwise direction. Then the oil pump is stopped as before and the connection of the pipes 26 and 27 is interchanged.

According to the construction as described above, it is possible to supply lubricant oil of a predetermined quantity to any desired number of parts, by merely connecting in cascade a plurality of the distributing valve units, or by increasing the number of piston pairs in one casing. In order to facilitate such cascade connection all oblique passages are arranged similarly. Different from the prior oiling devices comprising a pilot valve and a main piston of different diameter, all pistons of this invention can be made so as to have equal diameter and can effect dual function of the main piston as well as the pilot or control piston. In other words, each pair of pistons functions to feed a predetermined quantity of the lubricant and at the same time to control the flow of actuating oil to the adjacent pair of pistons.

Therefore, by constructing or manufacturing only a few kinds of component parts, it is possible to provide a distributing valve having any number of stages, or by preparing a few types of standard distributing valve units each having a different number of piston pairs and oil supply ports and by selectively combining the above-mentioned valve units, it is possible to provide oil supply devices which can supply oil sequentially to any desired number of moving parts requiring oiling thus greatly increasing the flexibility of application.

The oiling device of this invention can be used in machine tools, rolling mills, automobiles, railway rolling stock and many other machines and apparatus having a plurality of moving parts requiring intermittent oil supply of a predetermined quantity. Since the distributing valve of this invention is compact and light, it can be mounted in a limited space. Moreover, as the piston pairs operate successively, no matter how many distributing valve units are connected in cascade, the capacity of the oil pump may be made small.

However, if too large a number of cylinders are connected in series, the pressure drop in the oil would become excessive. This difficulty can be overcome by the embodiment of Fig. 2. In Fig. 2, two identical distributing valve units A and B are connected in series. In this instance, the pressure oil or grease is supplied in the upper portion of the cylinder 4 of the distributing valve A through the pipe 29, change over valve 22a and the pipe 26. This oil will cause the pistons 39 and 40 to move downward, as in the case of Fig. 1, and will enter into the upper portion of the cylinder 3 through the oblique passage 15 to force the pistons 37 and 38 in the downward direction in the cylinder 3. Accordingly, the oil beneath the piston 38 will be supplied into the space of the cylinder 4 between the pistons 39 and 40 through the oblique passage 16, and thence to the parts requiring oiling through the oil outlet port 42. When the pistons 37 and 38 reach their lowermost position shown in Fig. 2, the oblique passage 13 is opened to introduce the pressure oil into the upper portion of the cylinder 2 to push the pistons 35 and 36 in the downward direction. By this movement, the oil beneath the cylinder 36 is introduced into the space between the cylinders 37 and 38, and then supplied to the parts requiring oiling through the oil outlet port 44.

The construction of the distributing valve A as described above is somewhat similar to that shown in Fig. 1 and parts similar thereto are similarly numbered. The righthand end wall 19 of the valve A is provided with a passage extending in a direction axially of the cylinders. The upper end of this passage is connected with the pipe 26 through a branch pipe 56 and a check valve 55 while the lower end thereof is connected with the pipe 27 through a pipe 57 and a check valve 54. This passage is in communication with the cylinder 2 through transverse openings 50, 59, 53 and 49. A branch pipe 52 from the pipe 56 opens in the cylinder 2 at a height corresponding to the opening 53, and similarly a branch pipe 58 from the pipe 27 opens in the cylinder 2 at a height corresponding to the opening 59. The check valve 55 is held in the closed state by the oil pressure applied thereon through the pipes 26 and 56 and when the pistons 35 and 36 are brought to the lowermost position as shown in Fig. 2, the pressure oil is introduced into the passage 51 through the opening 50 to open the lower check valve 54. At the same time, the pressure oil is directly introduced into the passage 51 through the branch pipe 52, the space in the cylinder 2 between pistons 35 and 36 and the opening 53. Then, the oil is introduced into the upper portion of the cylinder 4a of the second distributing valve B through the pipe 57 and the passage 24a. The distributing valve B is substantially identical with the distributing valve A and operates in the same manner, the parts of valve B corresponding to those of the valve A being shown by the same reference characters with suffix a. When various piston pairs in the valve B have been successively operated and the last piston pairs 35a and 36a reach the position shown in Fig. 2, the pressure oil will return to the differential cylinder 106 via the change over valve 22a through the check valve 54a and pipes 57a and 26a, and if the pressure of the oil in the pipe 26a reaches a predetermined value, the change over valve 22 will interchange the connection between pipes 26 and 26a and stop the operating motor of the oil pump, as before.

The construction of the change-over valve 22a is similar to the change-over 22 shown in Fig. 1, except that a groove 102a which is provided on the periphery of the rotary valve 100 is in communication with the drain tank (not shown) through a pipe 104. When the rotary valve rotates in a clockwise or counterclockwise direction, as will be explained hereinafter, groove 102a will be placed in communication with the pipe 20a or 21a which are respectively connected to the opposite sides of the differential cylinder 106.

The operation of the distributing valve device is as follows:

Assuming now that the rotary valve member of the change-over valve 22a is in the position shown by solid lines in Fig. 2, oil or grease is supplied under pressure into the space of the cylinder 4 above the piston 39 by way of pipe 29, groove 103, and pipe 26. Then, the distributing valves A and B operate as explained above, and the pressure oil will be returned to the change-over valve through the pipe 26a. Then the oil in pipe 26a will enter into the passage 105 of the rotary valve member 101, and into the lower end of the differential cylinder 106 through the pipe 21a. Thus, the piston 107 moves to the upper portion of the cylinder 106. This movement of the piston will cause the rotary valve 101 to rotate in a clockwise direction to a position shown by dotted lines in Fig. 2. In this position, the pipe 29 will be connected with the pipe 26a through the groove 103, and the pipe 26 will be connected with the pipe 20a through the passage 105, and the pipe 21a with the drain pipe 104 through the groove 102a.

As described above, a suitable switch is associated with the change-over valve so as to de-energize the pump driving motor whenever the piston 107 is moved to its upper or lower position.

If the pump 28 is again started, the pressure oil will be supplied to the lower portion of the cylinder 4a to force the pistons 39a and 40a in the upward direction. After the piston 39a has closed the passage 15a, the oil above this piston will be supplied to the underside of the piston 40 to move it upward. Although by this upward motion, the passage 16 is opened, no successive operations of the piston pairs 37 and 38, and 35 and 36 would occur, because no additional oil is supplied to the piston 38 or 36 until the check valve 55a is opened. After the passage 16a is opened by the piston 40a each piston pair in the valve unit B will operate in the reverse direction, and finally pressure oil is introduced into the lower portion of the cylinder 2a through the oblique passages 16a and 14a. By the successive upward movements of the piston pairs, oil is supplied to the parts requiring oiling through ports 41a, 42a, 43a and 44a and oblique passages 15a and 13a.

When the pistons 35a and 36a reach their upper position, the branch pipe 58a is connected with the passage 51a in the end wall 19a through the space between the pistons 35a and 36a and the opening 59a which will result in the opening of the check valve 55a to supply the pressure oil to the underside of the piston 40 in the cylinder 4 of valve unit A through the pipes 56a and 27. Since the pistons 37 and 40 have already been moved to their upper position as mentioned above, the pressure oil will immediately move the pistons 37 and 38 to their upper positions, and then actuate the pistons 35 and 36. By such upward movement, the oil in the upper portion of the cylinders 2 and 3 are sent out through the outlet ports 43 and 41, respectively, of the preceding cylinders 3 and 4. When the check valve 55 is opened, the oil is returned to the differential cylinder 106 via the change over valve 22 to actuate it for exchanging the connection between the pipes 26 and 26a and also for stopping the pump.

By the distributing valve unit shown in Fig. 2, oil is supplied to each distributing valve at substantially equal pressure regardless of the pressure drop in the valve unit, because the valve unit is rendered ineffective whenever it completes its operation and is subsequently rendered effective for operation. This assures the supply of substantially the same quantity of oil from all oil outlet ports with an oil pump of small capacity.

While this invention has been shown and described in connection with particular embodiments thereof, it will be obvious to those skilled in the art that various modifications may be made without departing from the true spirit of this invention.

What we claim as new and desire to secure by Letters Patent of the United States is:

1. In a lubricant dispensing system for distributing a lubricant under pressure, in combination, a lubricant supply pump for providing a lubricant under pressure, two substantially alike metering-distributor valves connected in series each having a plurality of pressure responsive means reciprocable sequentially in a predetermined sequence and each reciprocable between opposite terminal positions to individually discharge sequentially, metered quantities of lubricant from said metering-distributor valves, means comprising conduits connected between the pump and said metering-distributor valves for providing lubricant under pressure to said valves for metering and distributing therefrom and connected to apply pressure to one of said reciprocable means of a respective metering-distributor valve to alternately move it between opposite terminal positions in dependence upon which conduit is under pressure from the pump, said last-mentioned means including a change-over valve connected to said conduits between the pump and said metering-distributor valves having a rotary valve member operable to two separate operative positions for alternately connecting each of the valves with the pump, means to automatically alternately render ineffective the metering-distributor valves individually after each meter's lubricant to insure that said metering-distributor valves operate at substantially similar pressures including means to render them effective successively, and means operatively connected to said metering-distributor valves through said change-over valve responsive to lubricant flow under pressure causing the change of positions of one of said reciprocable means for automatically, alternately positioning the change-over rotary valve member in its two operative positions thereby to alternately provide the metering-distributor valves lubricant under pressure from the pump.

2. In a lubricant dispensing system for distributing a lubricant under pressure, in combination, a lubricant supply pump for providing a lubricant under pressure, two substantially alike metering-distributor valves connected in series each having a plurality of cylinders of equal size, pressure responsive floating pairs of pistons in each cylinder reciprocable sequentially in a predetermined sequence and each pair reciprocable jointly between opposite terminal positions to individually discharge sequentially, metered quantities of lubricant from said metering-distributor valves, means comprising conduits connected between the pump and said metering-distributor valves for providing lubricant under pressure to said valves for metering and distributing therefrom and connected to apply pressure to one of said reciprocable pairs of pistons of a respective metering-distributor valve to alternately move it between opposite terminal positions in dependence upon which conduit is under pressure from the pump, said last-mentioned means including a change-over valve connected to said conduits between the pump and said metering-distributor valves having a rotary valve member operable to two separate operative positions for alternately connecting each of the valves with the pump, means to automatically alternately render ineffective the metering-distributor valves individually after each meter's lubricant to insure that said metering-distributor valves operate at substantially similar pressures including means to render them effective successively, and means operatively connected to said metering-distributor valves through said change-over valve responsive to lubricant flow under pressure causing the change of positions of one of said reciprocable pairs of pistons for automatically, alternately positioning the change-over rotary valve member in its two operative positions thereby to alternately provide the metering-distributor valves lubricant under pressure from the pump.

3. In a lubricant dispensing system for distributing a lubricant under pressure, in combination, a lubricant supply pump for providing a lubricant under pressure, two substantially alike metering-distributor valves connected in series each having a plurality of pressure responsive floating pairs of pistons reciprocable sequentially in a predetermined sequence and each pair reciprocable jointly between opposite terminal positions to individually discharge sequentially, metered quantities of lubricant from said metering-distributor valves, means comprising conduits connected between the pump and said metering-distributor valves for providing lubricant under pressure to said valves for metering and distributing therefrom and connected to apply pressure to one of said reciprocable pairs of pistons of a respective metering-distributor valve to alternately move it between opposite terminal positions in dependence upon which conduit is under pressure from the pump, said last-mentioned means including a change-over valve connected to said conduits between the pump and said metering-distributor valves having a rotary valve member operable to two separate operative positions for alternately connecting each of the valves with the pump, means to automatically alternately render ineffective the metering-distributor valves individually after each meters lubricant to insure that said metering distributor valves operate at substantially similar pressures including means to render them effective successively and means operatively connected to said metering-distributor valves through said change-over valve responsive to lubricant flow under pressure causing the change of positions of one of said reciprocable pairs of pistons for automatically, alternately positioning the change-over rotary valve member in its two operative positions thereby to alternately provide the metering-distributor valves lubricant under pressure from the pump.

References Cited in the file of this patent
UNITED STATES PATENTS

| | | |
|---|---|---|
| 2,269,928 | Dirkes | Jan. 13, 1942 |
| 2,440,410 | Leonard | Apr. 27, 1948 |